(12) United States Patent
Laurila et al.

(10) Patent No.: US 6,772,117 B1
(45) Date of Patent: *Aug. 3, 2004

(54) METHOD AND A DEVICE FOR RECOGNIZING SPEECH

(75) Inventors: Kari Laurila, Tampere (FI); Olli Viikki, Tampere (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 752 days.

(21) Appl. No.: 09/057,729

(22) Filed: Apr. 9, 1998

(30) Foreign Application Priority Data

Apr. 11, 1997 (FI) .................................. 971521

(51) Int. Cl.[7] ............................................. G10L 15/20
(52) U.S. Cl. ..................................................... 704/233
(58) Field of Search ............................... 704/231, 233, 704/234, 236, 251, 254, 255

(56) References Cited

U.S. PATENT DOCUMENTS

| | | | | | |
|---|---|---|---|---|---|
| 4,227,176 | A | * | 10/1980 | Moshier | 704/231 |
| 4,713,778 | A | * | 12/1987 | Baker | 704/254 |
| 5,131,043 | A | * | 7/1992 | Fujii | 704/254 |
| 5,293,588 | A | * | 3/1994 | Satoh et al. | 704/233 |
| 5,369,726 | A | * | 11/1994 | Kroecker et al. | 704/236 |
| 5,640,485 | A | | 6/1997 | Ranta | 395/2.6 |

FOREIGN PATENT DOCUMENTS

| | | |
|---|---|---|
| EP | 0 301 199 A1 | 2/1989 |
| EP | 0 586 996 A2 | 3/1994 |
| EP | 0 694 906 A1 | 1/1996 |

OTHER PUBLICATIONS

"Real–Time Recognition of Broadcast Radio Speech", Cook et al., 1996 IEEE International Conference on Acoustics, Speech, and Signal Processing, pp. 141–144 vol. 1.

"A Recursive Feature Vector Normalization Approach For Robust Speech Recognition in Noise", Viikki et al., 1998 IEEE International Conference on Acoustics, Speech, and Signal Processing, pp. 733–736 vol. 2.

L. Rabiner, "A tutorial on Hidden Markov Models and selected applications in speech recognition", Proceedings of IEEE, vol. 77, No. 2. Feb. 1989.

J. Picone, "Signal modeling techniques in speech recognition", IEEE Proceedings, vol. 81, No. 9, pp. 1215–1247, Sep. 1993.

* cited by examiner

*Primary Examiner*—David D. Knepper
(74) *Attorney, Agent, or Firm*—Perman & Green, LLP (57) ABSTRACT

In a speech recognition method and apparatus, according to the present invention, feature vectors produced by an analysing unit of a speech recognition device are modified for compensating the effects of noise. According to the invention, feature vectors are normalized using a sliding normalization buffer (31). By means of the method according to the invention, the performance of the speech recognition device improves in situations, wherein the speech recognition device's training phase has been carried out in a noise environment that differs from the noise environment of the actual speech recognition phase.

14 Claims, 6 Drawing Sheets

METHOD AND A DEVICE FOR RECOGNIZING SPEECH

OBJECT OF THE INVENTION

The present invention relates to speech recognition and particularly to a method for modifying feature vectors to be determined in speech recognition. The invention also relates to a device that applies the method, according to the present invention, for improving speech recognition.

BACKGROUND OF THE INVENTION

The invention is related to automatic speech recognition, particularly to speech recognition based on Hidden Markov Models (HMM). Speech recognition, based on the HMM, is based on statistical models of recognisable words. At the recognition phase, observations and state transitions, based on Markov chains, are calculated in a pronounced word and, based on probabilities, a model, stored in the training phase of the speech recognition device and corresponding to the pronounced word, is determined. For example, the operation of speech recognition, based on the Hidden Markov Models, has been described in the reference: "L. Rabiner, "A tutorial on Hidden Markov Models and selected applications in speech recognition", Proceedings of the IEEE, Vol. 77, No. 2. February 1989.

The problem in the current speech recognition devices is that the recognition accuracy decreases considerably in a noisy environment. In addition, the performance of speech recognition devices decreases in particular if the noise conditions during the operation of the speech recognition device differ from the noise conditions of the training phase of the speech recognition device. This is, indeed, one of the most difficult problems to solve in speech recognition systems in practice, because it is impossible to take into consideration the effects of all noise environments, wherein a speech recognition device can be used. A normal situation for a user of a device utilising a speech recognition device is that the speech recognition device's training is carried out typically in an almost noiseless environment, whereas in the speech recognition device's operating environment, e.g., when used in a car, the background noise, caused by surrounding traffic and the vehicle itself, differs considerably from the nearly quiet background noise level of the training phase.

The problem in the current speech recognition devices is also that the performance of a speech recognition device is dependent on the microphone used. Especially in a situation, wherein a different microphone is used at the training phase of the speech recognition device than at the actual speech recognition phase, the performance of the speech recognition device decreases substantially.

Several different methods have been developed for eliminating the effect of noise in the calculation of feature vectors. However, the speech recognition devices that utilise these methods can only be used in fixed computer/work station applications, wherein speech is recognised in an off-line manner. It is typical of these methods that the speech to be recognised is stored in a memory of a computer. Typically, the length of the speech signal to be stored is several seconds. After this, the feature vectors are modified utilising, in the calculation, parameters defined from the contents of the entire file. Due to the length of the speech signal to be stored, these kinds of methods are not applicable to real-time speech recognition.

In addition, there is provided a normalisation method, wherein both speech and noise have their own normalisation coefficients, which are updated adaptively using a voice activity detector (VAD). Due to adaptive updating, the normalisation coefficients are updated with delay, whereupon the normalisation process is not carried out quickly enough in practice. In addition, this method requires a VAD, the operation of which is often too inaccurate for speech recognition applications with low signal to noise ratio (SNR) values. Neither does this method meet the real-time requirements due to said delay.

SHORT SUMMARY OF THE INVENTION

Now, a method and an apparatus have been invented for speech recognition to prevent problems presented above and, by means of which, feature vectors determined in speech recognition are modified to compensate the effects of noise. The modification of the feature vectors is carried out by defining mean values and standard deviations for the feature vectors and by normalising the feature vector using these parameters. According to a preferred embodiment of the present invention, the feature vectors are normalised using a sliding normalisation buffer. By means of the invention, the updating of the normalisation parameters of the feature vector is carried out almost without delay, and the delay in the actual normalisation process is sufficiently small to enable a real-time speech recognition application to be implemented.

In addition, by means of the method according to the present invention, it is possible to make the performance of a speech recognition device less dependent on the microphone used. By means of the invention, an almost as high a performance of the speech recognition device is achieved in a situation, wherein a different microphone is used at the experimental and recognition phase of the speech recognition device than in a situation, wherein the same microphone is used at both the training and recognition phase.

The invention is characterised in what has been presented in the characterising parts of claims 1 and 4.

DETAILED PRESENTATION OF THE INVENTION

Figure 1:
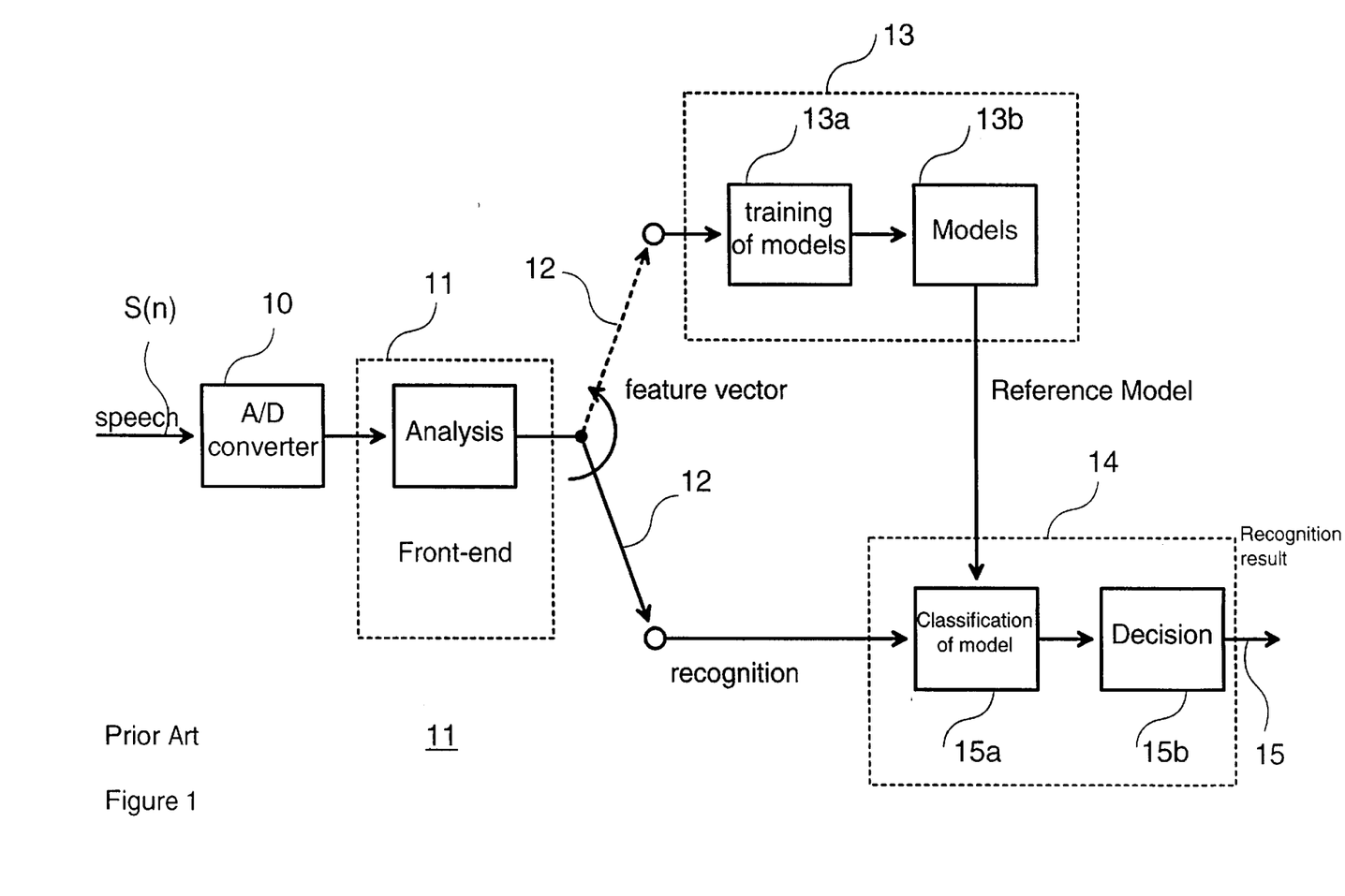
FIG. 1 illustrates the structure of a speech recognition device, according to prior art, as a block diagram.

FIG. 1 illustrates the block diagram structure of a known speech recognition device as applicable to the present invention. Typically, the operation of the speech recognition device is divided into two different main activities: an actual speech recognition phase 10–12, 14–15 and a speech training phase 13 as illustrated in FIG. 1. The speech recognition device receives from a microphone as its input a speech signal s(n), which is transformed into a digital form by means of an A/D converter 10 using, e.g., a sampling frequency of 8 kHz and a 12 bit resolution per sample.

Typically, the speech recognition device comprises a so-called front-end 11, wherein the speech signal is analysed and a feature vector 12 is modelled, the feature vector describing the speech signal during a specific period. The feature vector is defined, e.g., at 10 ms intervals. The feature vector can be modelled using several different techniques. For example, several different kinds of techniques for modelling a feature vector have been presented in the reference: J. Picone, "Signal modelling techniques in speech recognition", IEEE Proceedings, Vol. 81, No. 9, pp. 1215–1247, September 1993. The feature vector used in the present invention is modelled by defining so-called Mel-Frequency Cepstral Coefficients (MFCC). During the training phase, models are constructed by means of the feature vector, in a training block 13 of the speech recognition device, for the words used by the speech recognition device. In model training 13a, a model is determined for a recognisable word. At the training phase, repetition of the word to be modelled can be utilised. The models are stored in a memory 13b. During speech recognition, the feature vector is transmitted to an actual recognition device 14, which compares, in a block 15a, the models, constructed during the training phase, to the feature vectors, to be constructed of the recognisable speech, and the decision on a recognition result is made in a block 15b. The recognition result 15 denotes the word, stored in the memory of the speech recognition device, that best corresponds to the word pronounced by a person using the speech recognition device.

Figure 2:
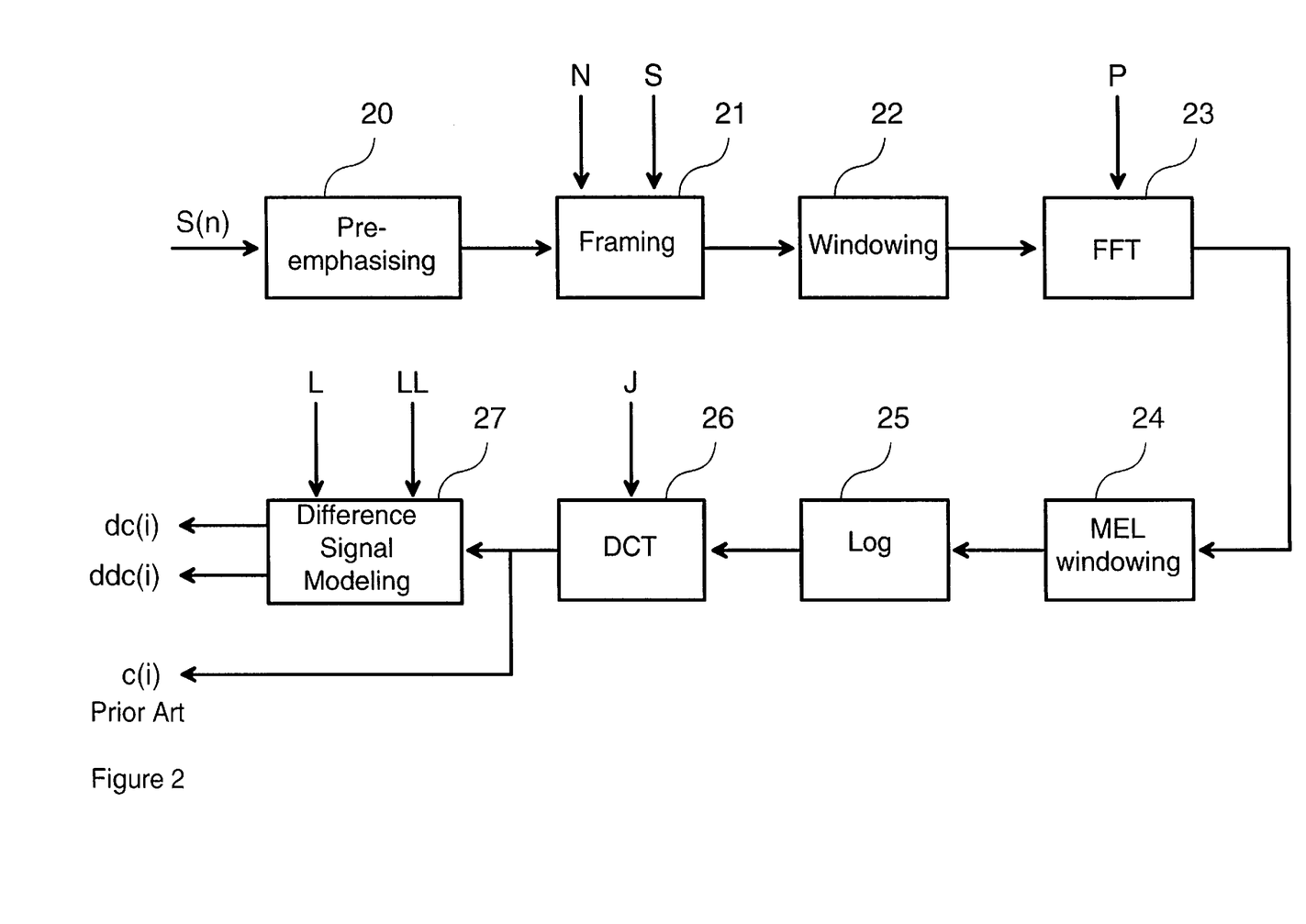
FIG. 2 illustrates the structure of an analysis block, according to prior art, as a block diagram.

FIG. 2 illustrates the structure of a known analysing block of the front-end 11, applicable to the present invention. Typically, the front-end 11 comprises a pre-emphasising filter 20 for emphasising frequencies relevant to speech recognition. Typically, the pre-emphasis filter 20 is a high-pass filter, e.g., a 1st degree FIR filter having a response of $H(z)=1-0.95z^{-1}$. Next, frames, N samples in length, are formed of a filtered signal in a block 21. By using, e.g., a sample length N=240, a frame structure of 30 ms is produced at the sampling frequency of 8 kHz. Typically, the speech frames can also be formed using a so-called overlap technique, wherein successive frames overlap to the extent of S successive samples (e.g., 10 ms). Before modelling a Fast Fourier Transform (FFT) frequency representation for the speech signal in a block 23, so-called windowing can also be carried out in order to improve the accuracy of a spectrum estimate using, e.g., a Hamming window in a block 22. Next, the FFT representation of the signal is transformed into a Mel frequency representation in a Mel windowing block 24. The transformation into the Mel frequency representation is known as such to a person skilled in the art. The transfer to the Mel frequency representation has been presented in the source reference: "J. Picone, "Signal Modelling Techniques in Speech Recognition", IEEE Proceedings, Vol. 81, No. 9". With this frequency transformation, the non-linear sensitivity of the ear to different frequencies is taken into consideration. Typically, the number (k) of the frequency bands used can be k=24. The actual feature vector 12, i.e., the so-called cepstral coefficients $c(i)$ are obtained by carrying out a so-called discrete cosine transformation (DCT) for 26 logarithmic Mel values, formed in a block 25. For example, the number of degrees J=24 can be used in the discrete cosine transformation. Typically, only half of the DCT coefficients $c(i)$, wherein i is the index of a cosine term, is used. Typically, the actual feature vector also contains information on speech dynamics by calculating so-called 1st and 2nd stage difference signals $dc(i)$, $ddc(i)$. These difference signals can be determined from the successive output vectors of a discrete cosine transformation block, in a block 27, by estimating that $dc(i)=c(i)-c(i-1)$ and $ddc(i)=dc(i)-dc(i-1)$. When these 26 additional parameters are taken into account, the length of the feature vector, in our exemplary case, is 13+26=39 parameters.

Figures 3A, 3B:
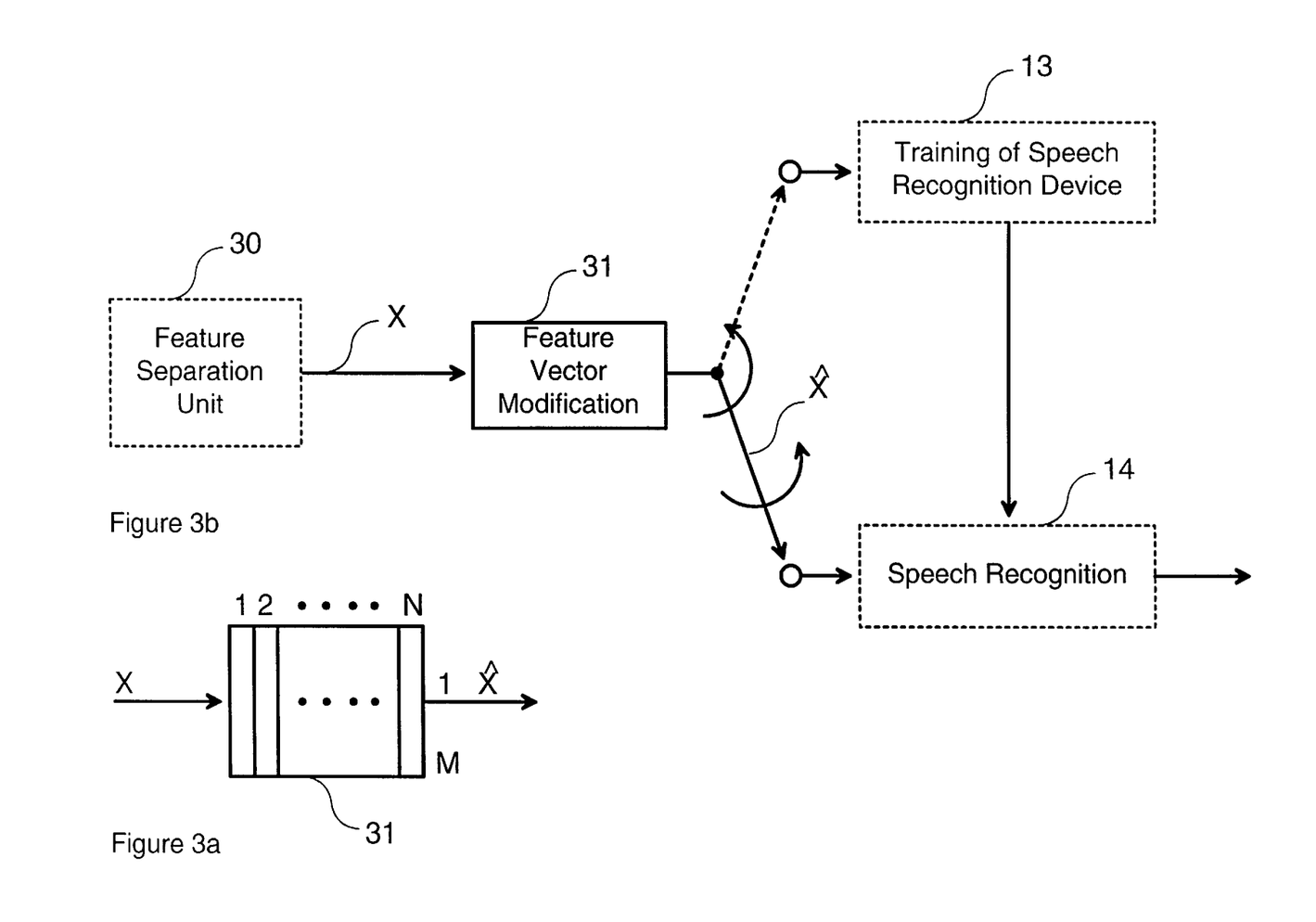
FIGS. 3a and 3b illustrate the structure of a speech recognition device according to the invention.

FIGS. 3a and 3b illustrate the structure of the speech recognition device according to a first embodiment of the present invention. A front-end 30 produces, as an output signal, a feature vector $x_i$, i=1 ... M (e.g., M=39), at 10 ms intervals. The feature vector is stored in a normalisation buffer 31, by means of which a mean value $\mu_i$ and a standard deviation $\sigma_i$ are calculated for each feature vector component x1, i=1 ... M as follows:

$$\mu_i = \frac{1}{N}\sum_{t=1}^{N} x_{t,i}, i = 1, \ldots, M \qquad 1$$

$$\sigma_i = \sqrt{\frac{1}{N}\sum_{t=1}^{N}(x_{t,i}-\mu_i)^2}, i = 1, \ldots, M \qquad 2$$

Figure 4:
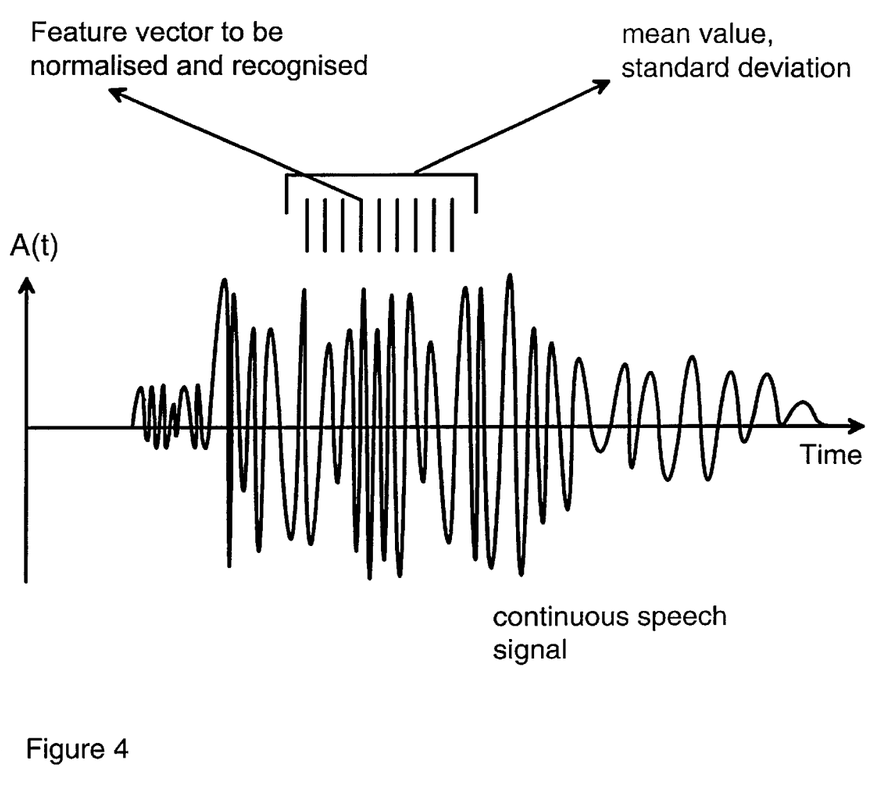
FIG. 4 illustrates the use of a normalisation buffer according to the invention.

In the formulas (1) and (2), N is the length of the normalisation buffer and M is the length of the feature vector. After this, the component $x_i$ of the feature vector to be recognised is normalised in a block 31 using the calculated normalisation coefficients $\mu_i$, $\sigma_i$. The feature vector X to be normalised and recognised is located in the middle of the normalisation buffer 31 as illustrated in FIG. 4.

$$\hat{x}_i = \frac{x_i - \mu_i}{\sigma_i}, i = 1, \ldots, M \qquad 3$$

The normalised feature vector $\hat{X}$ is transmitted as an input signal either to the speech recognition unit 14 or to the training block 13 depending on whether the question is of the training phase of the speech recognition device or of the actual speech recognition phase. In the method according to the first embodiment of the present invention, a normalisation buffer fixed in length (N) is preferably used, the buffer being slid over the feature vectors. Due to the sliding normalisation buffer, the method can also be implemented in a real-time speech recognition system. A normalisation buffer 34 is a buffer N*M samples in size, which can typically be implemented in connection with the speech recognition unit by programming a digital signal processor (DSP) using either the internal memory structures or the external memory of the DSP. In the solution, according to the example of the present invention, the normalisation buffer is 100 feature vectors in length. The feature vector to be normalised and recognised at any one time is located in the middle of the normalisation buffer 34. Because the feature vector to be normalised is located in the middle of the normalisation buffer, a delay N which is of the normalisation buffer's length is caused in speech recognition. When using the parameters of the example, the delay is 100*10 ms=1 s. However, this delay can be halved by using only part of the buffer's length at the beginning of speech recognition as explained in the following.

Figure 5:
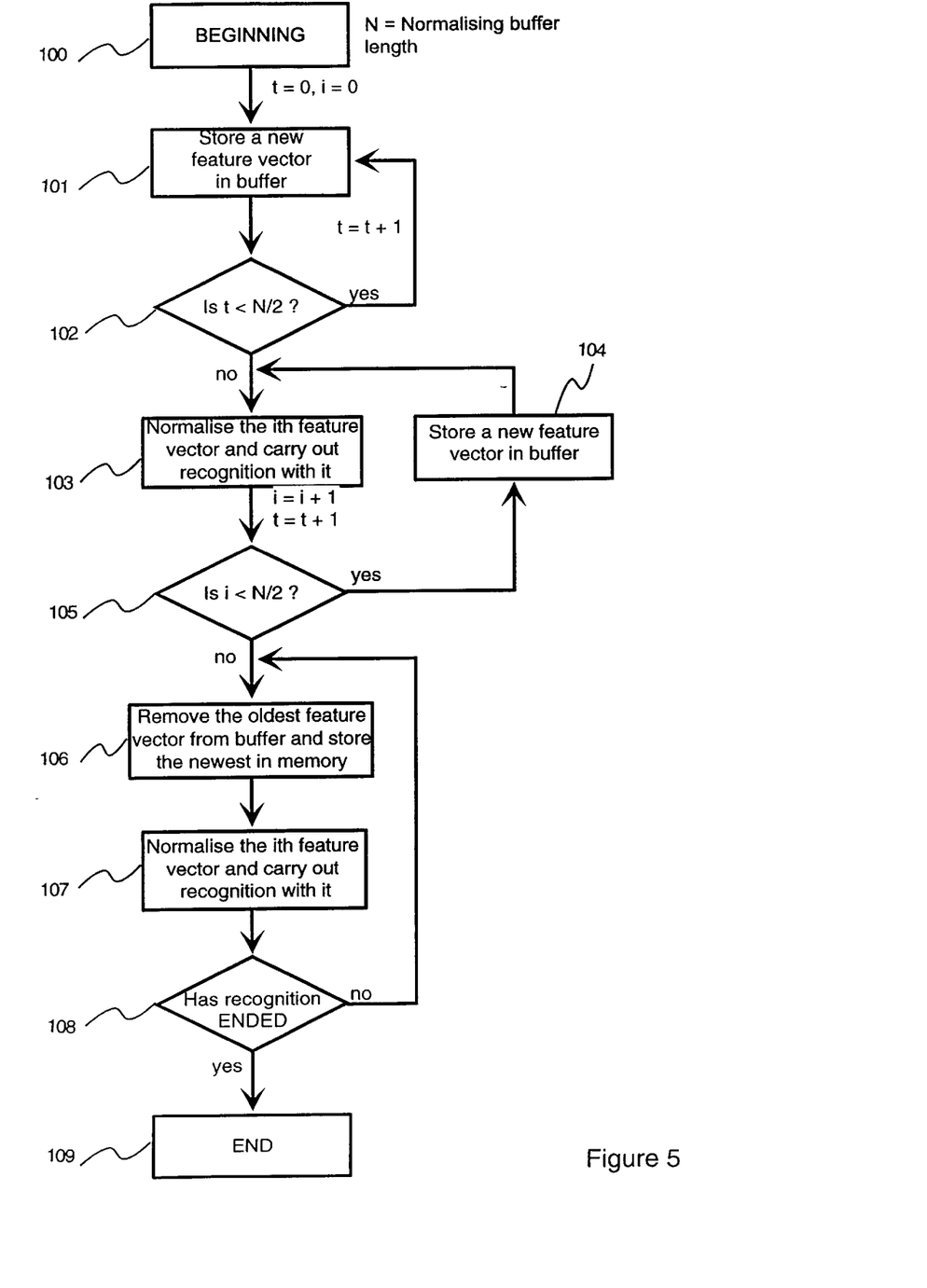
FIG. 5 illustrates the operation of a method according to the invention, as a flowchart.

FIG. 5 illustrates, in the form of a flowchart, the operation of the method according to the present invention. At the beginning of speech recognition, the normalisation buffer is filled for as long as one half of the buffer's full length N/2 has been used (blocks 100–102). After this, the mean value and standard deviation vectors $\mu_i$, $\sigma_i$, (block 103) are calculated and a first feature vector is normalised using the first N/2 feature vectors. The actual speech recognition process is carried out for this normalised feature vector $\hat{X}$ using Viterbi decoding in a block 15b (FIG. 1) according to a known technique. Next, a new feature vector is buffered (block 104), new normalisation coefficients are calculated using the (N/2+1) stored feature vectors and a second feature vector is normalised and recognition is carried out with it (block 103). The corresponding process is continued until the normalisation buffer is full. Then, a transfer is made, in the flowchart, from a block 105 to a block 106. This means that the first N/2 feature vectors have been recognised and the feature vectors to be normalised are located in the middle of the normalisation buffer. Now, the buffer is slid according to the FIFO principle (First In-First Out) so that after a new feature vector has been calculated and recognised (block 107), the oldest feature vector is removed from the normalisation buffer (block 106). At the end of the recognition phase (block 107), the normalisation coefficients are calculated using the values stored in the normalisation buffer. These same normalisation coefficients are used in connection with the recognition of the last N/2 feature vectors. Thus, the mean values and standard deviations are calculated using non-normalised feature vectors. When speech recognition has been carried out with all the N feature vectors (block 108), the speech recognition device models a result of the recognisable word (block 109).

According to a second embodiment of the present invention, the length of the normalisation buffer may vary during speech recognition. At the beginning of speech recognition, it is possible to use a buffer shorter in length, e.g., N=45, and the length of the signal to be buffered can be increased as speech recognition progresses, e.g., for each frame (30 ms). Thus, as an exception to the first exemplary application of the invention, the feature vector to be normalised can be the first feature vector loaded into the buffer and not the middle feature vector of the buffer, and the buffer's entire contents of that particular moment can be utilised in the calculation of the normalisation coefficients. In this application, the length of the delay is N, N being the length of a segment at the beginning of speech recognition (e.g., N=45).

A solution according to an application of the present invention is also that not all the components of a feature vector are normalised, but instead normalisation is carried out only for part of the feature vector's components. For example, normalisation can only be carried out for the most important components as regards human auditory sense perception/speech recognition. A modification according to the invention is also that normalisation is only carried out for feature vectors in relation to the mean value or the standard deviation. The modification of feature vectors can also be carried out more generally in relation to any statistical quantity.

Figure 6:
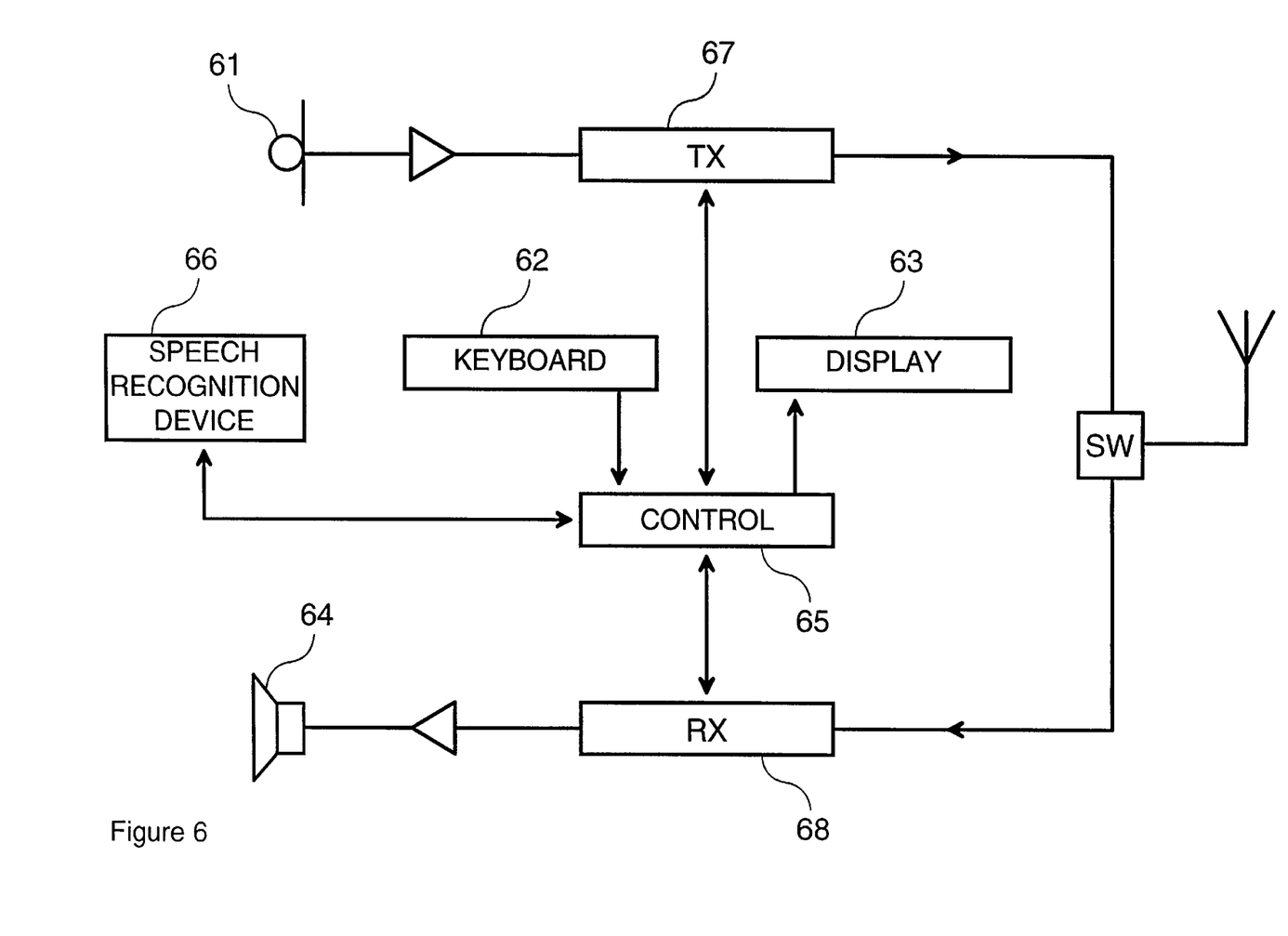
FIG. 6 illustrates the structure of a mobile station according to the invention.

FIG. 6 illustrates the structure of a mobile station, wherein there is provided a speech recognition device 66 utilising the present invention. The mobile station comprises parts, typical of the device, such as a microphone 61, a keyboard 62, a display 63, a speaker 64, as well as a control block 65, which controls the mobile station's operation. In addition, the figure shows transmission and reception blocks 67, 68, typical of the mobile station. The control block 65 also controls the operation of the speech recognition device 66 in connection with the mobile station. When the speech recognition device is activated either during the training phase of the speech recognition device or during the actual speech recognition process, audio commands given by a user are transmitted, controlled by the control block, from the microphone 61 to the speech recognition device 66. The audio commands can also be transmitted through a separate HF (hands free) microphone. Typically, the speech recognition device has been implemented by means of a DSP and it comprises ROM/RAM memory circuits necessary for its activities.

Table 1 illustrates the performance of a speech recognition device with the method according to the present invention, compared with other noise compensation techniques. The invention has been compared with the use of non-normalised Mel-frequency cepstral coefficients or the PMC technique (Parallel Model Combination). The test has been carried out using a hidden Markov model that has been modelled in a noiseless environment. During speech recognition, a noise signal has been added to the word to be recognised in order to achieve the required signal to noise ratio. A "Clean" mode corresponds to a situation, wherein both the training of the speech recognition device and the actual speech recognition process have been carried out in a noiseless environment. The test results show that the speech recognition device, according to the present invention, improves the reliability of a recognition device particularly in a noisy environment. In addition, it will be appreciated that the speech recognition device, according to the present invention, functions better than the PMC technique, which is computationally much more complicated than the method according to the invention.

TABLE 1

| Environment (SNR) | MFCC-coefficient | PMC | Norm. Feature vectors |
|---|---|---|---|
| Clean | 96.5% | 96.6% | 97.5% |
| 5 dB | 95.0% | 95.3% | 96.1% |
| 0 dB | 93.7% | 94.9% | 95.9% |
| −5 dB | 89.3% | 93.0% | 95.3% |
| −10 dB | 73.8% | 84.6% | 94.3% |

This paper presents the implementation and embodiments of the present invention with the help of examples. For example, the invention has been presented above in a speech recognition device, which is based on the HMM. However, the invention is also suitable for use in speech recognition devices based on other techniques. The invention can be applied, for example, to speech recognition devices utilising neural networks. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

What is claimed is:

1. A method for recognising speech, wherein a recognisable speech signal is divided in time into successive frames of specific length, each speech frame is analysed for producing at least one parameter per frame, illustrating the speech signal, said parameters, relating to each frame, are stored in a sliding buffer for minimizing the delay due to the normalization process for calculation of normalisation coefficients for each frame, said parameters are modified utilising said normalisation coefficients and speech recognition is carried out utilising the modified parameters, wherein only part of the successive parameters are stored periodically and at least one parameter is modified on the basis of the parameters stored periodically in order to produce said modified parameter, and for said modification, a standard deviation of said periodically stored parameters is defined, wherein only part of the stored parameters are used at the beginning of the speech recognition.

2. A method according to claim 1, wherein, on the basis of N successive parameters, a mean value is defined for said modification and wherein N is an integral number.

3. A method according to claim 1, wherein said modification of the parameter comprises normalisation in relation to said standard deviation.

4. A method according to claim 1, wherein said standard deviation is calculated using non-normalised feature vectors.

5. A method according to claim 1, wherein the method is performed by a programmed digital signal processor.

6. A method according to claim 1, wherein the sliding buffer is implemented by programming a digital signal processor and utilizing at least one of an internal and external memory of the digital signal processor for the storing.

7. A method according to claim 1, wherein said parameters, that are to be modified utilising said normalisation coefficients, are stored in the middle of said sliding buffer, said sliding buffer having a certain fixed length.

8. A method according to claim 1, wherein once said sliding buffer is full of stored parameters, the buffer is slid according to a First In-First Out principle by storing parameters of new speech frames and removing the oldest parameters.

9. A method according to claim 1, wherein after analyzing each speech frame a feature vector is formed, the feature vector comprising said at least one parameter.

10. A method according to claim 1, wherein the method comprises first storing parameters of said speech frames until the sliding buffer is half full, and only then calculating said normalisation coefficients using all said stored parameters, and modifying said parameters utilising said normalisation coefficients, said stored parameters representing N/2 speech frames, where N is length of the sliding buffer.

11. A method according to claim 10, further comprising thereafter storing, calculating and modifying said parameters representing a new speech frame for each new speech frame utilizing all parameters stored in said sliding buffer.

12. A speech signal processing device comprising means for dividing the speech signal in time into successive frames, means for analysing a speech frame for producing at least one parameter illustrating the speech signal, a sliding buffer for storing the at least one parameter of each frame for calculation of normalization coefficients for each frame, means for modifying said at least one parameter utilizing said normalization coefficients for producing the modified at least one parameter and means for recognising speech utilising the modified at least one parameter, wherein said sliding buffer is arranged periodically to store only part of the successive parameters and said means for modifying the parameter have been arranged to modify the at least one parameter illustrating the speech signal on the basis of the parameters stored periodically in the sliding buffer for producing said modified parameter, the means for modifying the parameter is arranged to define a standard deviation of said periodically stored parameters, wherein the means for modifying is also arranged to use only a part of the stored parameters at a beginning of the speech recognition.

13. An apparatus according to claim 12, wherein said sliding buffer comprises a buffer fixed in length.

14. An apparatus according to claim 12, wherein said sliding buffer comprises a buffer varying in length.

* * * * *